United States Patent [19]

Yokoyama

[11] Patent Number: 4,568,106

[45] Date of Patent: Feb. 4, 1986

[54] PASSIVE RESTRAINT FOR A VEHICLE SEAT

[75] Inventor: Sho Yokoyama, Akishima, Japan

[73] Assignee: Tachikawa Spring Co., Ltd., Tokyo, Japan

[21] Appl. No.: 605,283

[22] Filed: Apr. 30, 1984

[51] Int. Cl.$^4$ ............................................. B60R 21/10
[52] U.S. Cl. ................................. 280/807; 280/802; 297/475
[58] Field of Search ............... 280/801, 802, 804, 807, 280/808; 297/468, 473, 474, 475

[56] References Cited

U.S. PATENT DOCUMENTS

| | | | |
|---|---|---|---|
| 3,637,258 | 1/1972 | Bayon | 297/483 |
| 3,695,696 | 10/1972 | Lohr et al. | 297/475 |
| 3,761,127 | 9/1973 | Giese et al. | 280/807 |
| 4,213,651 | 7/1980 | Yoshitsugu | 280/807 |
| 4,363,501 | 12/1982 | Takada | 280/807 |

Primary Examiner—John A. Pekar
Assistant Examiner—Kenneth R. Rice
Attorney, Agent, or Firm—Cushman, Darby & Cushman

[57] ABSTRACT

A passive restraint for a vehicle seat comprising a seat belt is disclosed which is designed so as to secure the security of an occupant. In this passive restraint, since a retractor is mounted in the inside front portion of one of side frame sections of a cushion frame and a belt guide is installed in the outside rear portion of the same one side frame section, an input from the seat belt will be little applied to the intermediate portion of the cushion frame, and points of the input is located adjacent to the front and rear points of installation of a slide rail. As a result of this, loads of the seat belt are distributed directly over the side of the slide rail, which offers an advantage to the cushion frame from the standpoint of strength.

9 Claims, 9 Drawing Figures

PASSIVE RESTRAINT FOR A VEHICLE SEAT

BACKGROUND OF THE INVENTION

1. Field of the Invention

The present invention relates to an improved passive restraint including a safety belt for use in a vehicle seat.

2. Description of the Prior Art

A vehicle such as an automobile is generally equipped with a passive restraint including a safety belt in order to secure the safety of an occupant when the vehicle is given a shock due to its collision or the like.

When such passive restraint is structured such that the occupant is able to adjust the position of his or her seat while the occupant is restricted or such that an anchor on the free end side of the safety or seat belt is positioned in a vehicle door or a vehicle wall, a retractor must be mounted on the seat side or within a cushion frame. When the retractor is installed within the cushion frame, however, if it is located on the lower surface side of a sitting portion of the seat or in a side portion opposed to an input portion of the seat belt, the retractor may be abutted against the lower surface of a seat pad forming the sitting portion, or the seat belt may be brought into contact with the same lower surface after it has run across the seat pad, which gives the occupant a strange feeling when the occupant is going to sit and provides an obstacle to the operation of the safety belt. In this case, the tension of the seat belt also generates input forces to a seat frame at both of its right and left portions so that a collapsing pressure is applied to the seat frame. Therefore, since the cushion frame is required to have a sufficient strength to withstand such collapsing load, every part of the cushion frame must be formed of a thicker material for reinforcement, which is disadvantagous in that the weight of the cushion frame itself is increased.

Also, in assembling such conventional passive restraint, the safety belt must be introduced externally through an insertion bore formed in a side surface of the cushion frame. Especially, it is difficult to pass a large-sized buckle mounted at the free end of the seat belt. As a result of this, it takes much trouble to assemble such prior art device.

SUMMARY OF THE INVENTION

Accordingly, the present invention aims at eliminating the drawbacks found in the prior art restraint device.

It is the primary object of the invention to provide an improved passive restraint in which a retractor is adapted so that the sitting comfort of an occupant is not impaired.

In attaining this object, according to the invention, the retractor is located interiorly of a front end of a cushion frame so as to be prevented from abutting against a sitting portion of a seat and thus so as not to impair the sitting comfort at all.

Another object of the invention is to provide an improved passive restraint which can eliminate any obstacle to the operation of a safety belt.

For this purpose, the safety belt of the invention is so arranged to extend along one side frame portion of the cushion frame. Consequently, since the sitting portion of the seat is scarcely contacted by the safety belt, the safety belt can be operated properly.

Another object of the invention is to reduce the weight of the cushion frame itself.

In order to achieve this object, according to the invention, the retractor is provided in the interior of the front end of the one side frame portion of the cushion frame so that an input generated from the safety belt can be borne only by the one side frame portion of the cushion frame. Since such input load can be dealt with cooperatively and integrally with a slide rail, the cushion frame has only to be increased in strength only at its one side frame portion with other portions thereof not required to be reinforced. Thus, the whole weight of the cushion frame can be reduced.

A further object of the invention is to provide an improved passive restraint which can be easily mounted to the cushion frame.

To accomplish this object, according to the invention, one side frame portion of the cushion frame includes a notched portion which extends from the upper surface to the side surface of the side frame portion so as to correspond to the position where the retractor is installed, end the safety belt is directly introduced through this notched portion. Accordingly, in fixing the retractor to the cushion frame, the safety belt can be inserted simply by allowing it to fall down from the opened upper surface of the notched portion, and even a large-sized buckle mounted to the tip end of the safety belt can be easily introduced.

A still further object of the invention is to provide an enhanced performance to restrain the occupant.

In order to achieve this object, according to the invention, the retractor is installed in the inner front portion of one side frame portion of the cushion frame, a belt guide is mounted in the outer front portion of the same side frame portion, and the same side frame portion is formed on its side surface with an insertion bore which is located along a straight line connecting the retractor with the belt guide. With such structure, the bending portion of the seat belt extended over the occupant can be wound round the retractor only at one location of the belt guide, so that the restraint performance of the invention is enhanced.

The retractor mentioned above is fastened to the slide rail by a bolt or the like together with cushion frame so that the load of the seat belt can be distributed directly to the slide rail.

These and other objects and many of the attendant advantages of this invention will be readily appreciated as the same becomes better understood by reference to the following detailed description when considered in connection with the accompanying drawings.

DETAILED DESCRIPTION OF PREFERRED EMBODIMENTS OF THE INVENTION

FIGS. 1 through 5 illustrate a first embodiment of a vehicle seat which is provided with a passive restraint constructed in accordance with the present invention.

Figure 5:
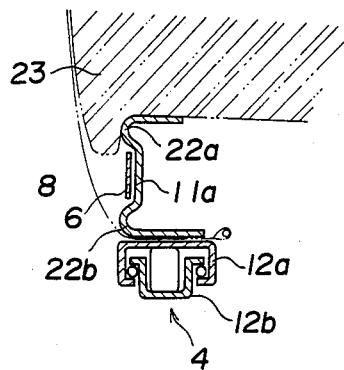
FIG. 5 is a centrally transverse cross section of the main portions shown in FIG. 4.
Figure 4:
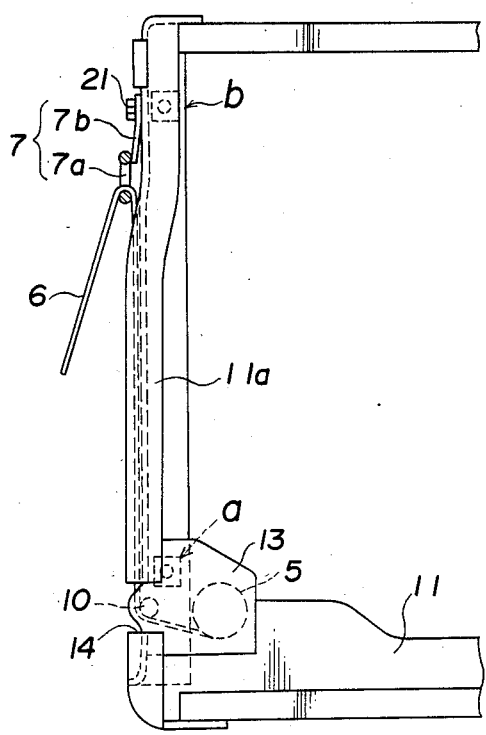
FIG. 4 is a plan view of main portions of the same cushion frame.
Figure 1:
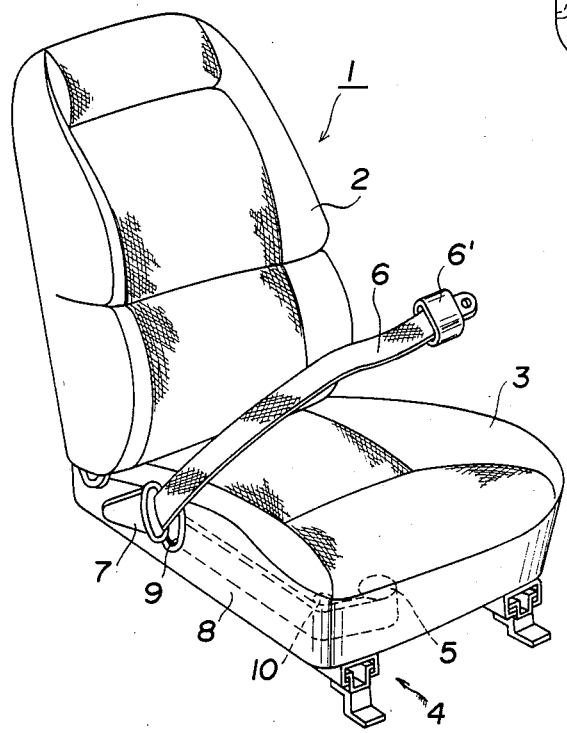
FIG. 1 is a perspective view of a first embodiment of a vehicle seat provided with a passive restraint constructed in accordance with the invention.
Figure 2:
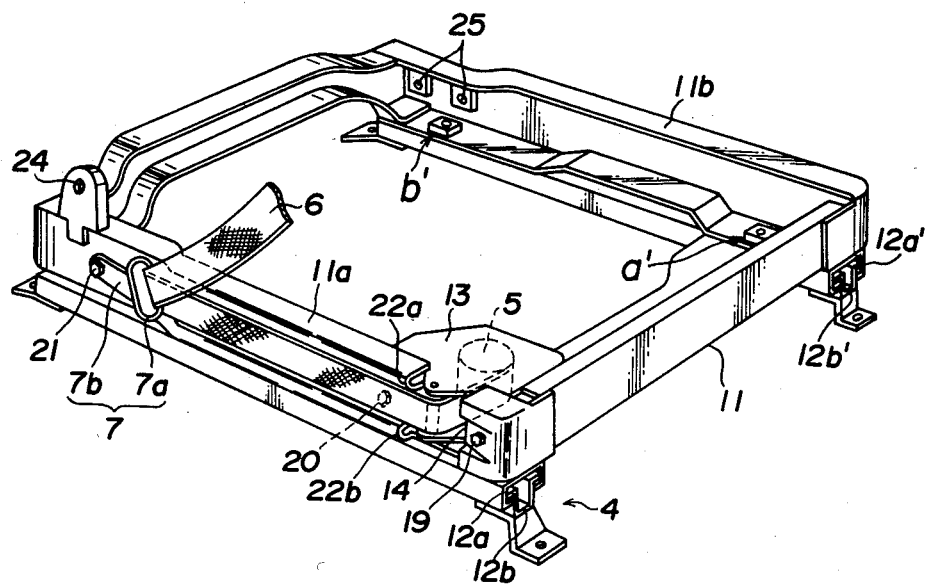
FIG. 2 is a perspective view of a cushion frame to which the passive restraint of the invention is mounted.
Figure 3:
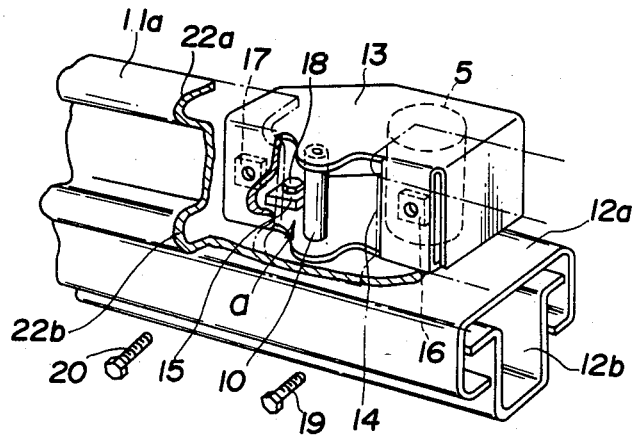
FIG. 3 is a partially cut-away perspective view of a portion of the cushion frame shown in FIG. 2.

In FIG. 1, reference character (1) designates the entire vehicle seat mentioned above, (2) represents a seat back of the same seat, and (3) denotes a seat cushion of the same seat. On the lower surface side of the seat cushion (3) there is disposed a seat adjuster (4), and in one of its side frame portions there is installed a passive restraint comprising a retractor (5), a safety belt (6) and a belt guide (7).

The passive restraint of the invention is constructed in such a manner that the seat belt (6) is folded back at the belt guide (7) mounted to the rear portion of one of the side surfaces of the seat cushion, is then directed through an insertion bore (9) formed in a top member (8), is next passed between the top member (8) and one of the side frame portions of a cushion frame (11), and is finally wound up via a guide roller (10) around the retractor (5) provided in the inside portion of the front end of the cushion frame (11).

The above-mentioned passive restraint device of the invention will now be described in detail with reference to FIGS. 2 through 5.

The retractor (5) is mounted to the inside portion of the front end of one (11a) of side frame portions or sections of the cushion frame (11), that is, to the front assembled portion (a) of the cushion frame assembled with respect to one (12a) of movable-side rails of a slide rail member (4) forming a part of the above-mentioned seat adjuster, by means of a casing (13) to which is journalled the guide roller (10).

The one side frame section (11a) of the cushion frame (11) is formed at such a position so as to correspond to the mounting position of the retractor (5), i.e., at a position opposed to the above-mentioned cushion frame front assembled portion (a) relative to the one movable-side rail or slightly forwardly of such position with a notched portion (14) which extends from the upper surface of the same section into the side surface of the same, and the casing (13) is disposed such that is corresponds to the interior of the notch portion (14), with the guide roller (10) fronting on the notch portion (14). With this state, the casing (13) is fixed between both side surfaces of the notched portion (14) in such a manner to bridge across the two side surfaces.

This casing (13) is provided with a nut (15) and two nuts (16),(17) respectively fixed to the lower surface and side surfaces thereof in a manner that they respectively correspond to the above-mentioned rail assembled portion and the two side portions of the frame notched portion (14). The nut (15) in the lower surface serves also as a fastening member for assembling the cushion frame to the movable rail. In other words, when a single bolt (18) is threaded into this nut (15), the movable rail (12a), one side frame section (11a) and casing (13) can be fastened together. On the other hand, the nuts (16),(17) provided in the side surfaces are respectively threaded with bolts (19),(20) inserted from outside into respective through bores formed in both side portions of the notch portion (14) so as to fix the casing (13) to the cushion frame (11).

In fixing the casing (13) to the cushion frame (11) in this manner, the seat belt or safety belt (6) can be inserted simply by allowing it to fall down by gravity from an open portion formed on the upper surface side of the notched portion (14), and thus even a large-sized buckle (6a) mounted to the tip end of the safety belt (6) can be easily introduced therethrough.

The belt guide (7) comprises a ring portion (7a) for insertion of the safety belt (6) and a support portion (7b), the rear end of which support portion (7b) is mounted by a bolt (21) onto the outer surface of the rear end of the one side frame portion (11a) at a position adjacent to a rail rear assembly portion (b) so that the belt guide (7) is free to oscillate in a vertical direction.

Also, the upper and lower edges of the outside surface of the one side frame section (11a) are respectively formed as ridge-like edges (22a),(22b) which are higher than the thickness of the seat belt (6) and also extend adjacent to the belt guide (7). Accordingly, the seat belt (6) that is folded back at the ring portion (7a) of the belt guide (7) can be guided along the outside of the one side frame section (11a) toward the retractor (5) without being influenced by the top member (8) and a seat pad (23). The seat belt (6) running along the outer surface of the one side frame section (11a), as described before, is then turned inwardly around the guide roller (10), is passed through the notch portion (14), and is finally wound up around the retractor (5).

In the drawings, reference (11b) designates the other side frame section of the cushion frame (11), (12a') represents the other movable-side rail, and (12b),(12b') denote two fixed-side rails respectively. Also, (24) stands for a free-hinge-side bracket of the seat back, (25) represents an assembling nut for a reclining device (not shown), and (a') and (b') designate the front and rear assembly portions of the other movable-side rail respectively.

FIGS. 6 through 9 illustrate a second embodiment of the present invention.

Figure 6:
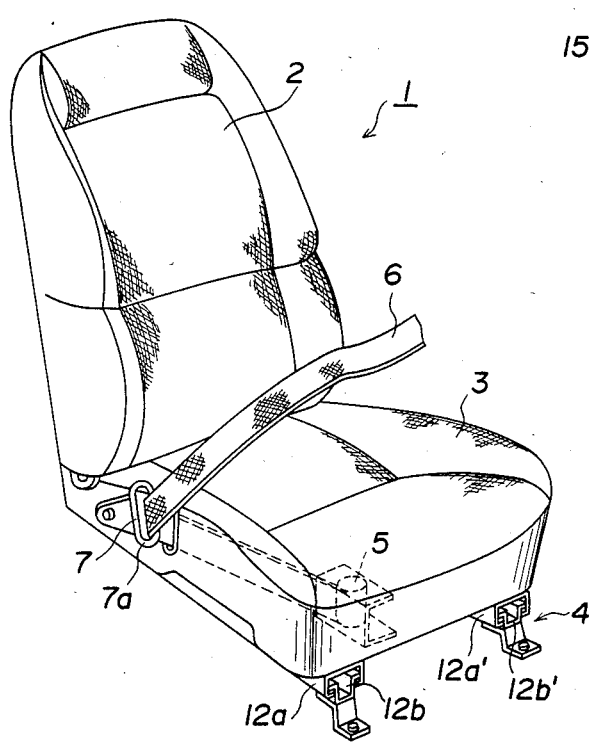
FIG. 6 is a perspective view of a second embodiment of a vehicle seat provided with a passive restraint constructed in accordance with the invention.

In FIG. 6, reference numeral (1) designates the whole vehicle seat provided with the passive restraint of the invention, (2) represents a seat back, and (3) denotes a seat cushion. A slide rail (4) of a seat adjuster is disposed on the lower surface side of the seat cushion (3). To this seat cushion is also mounted a passive restraint constructed in accordance with the invention and comprising a seat belt (6), a retractor (5) and a belt guide (7).

Figure 9:
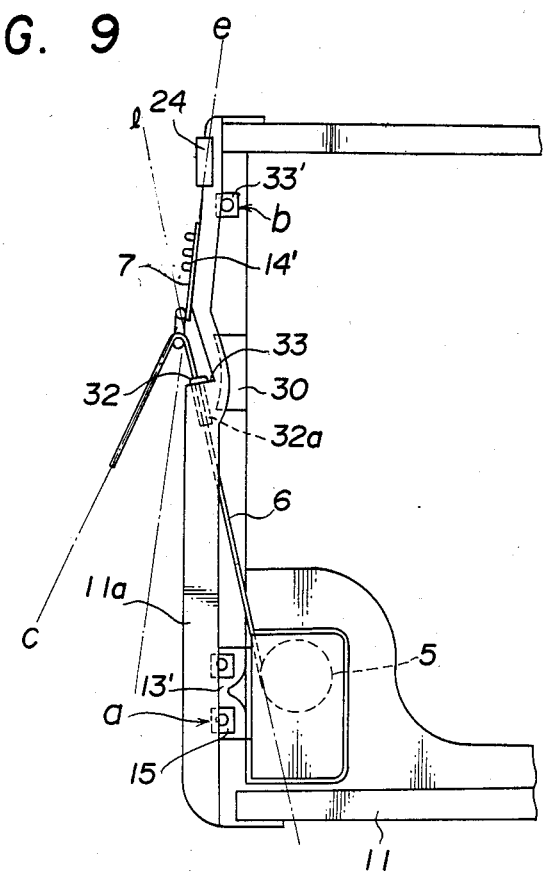
Figure 7:
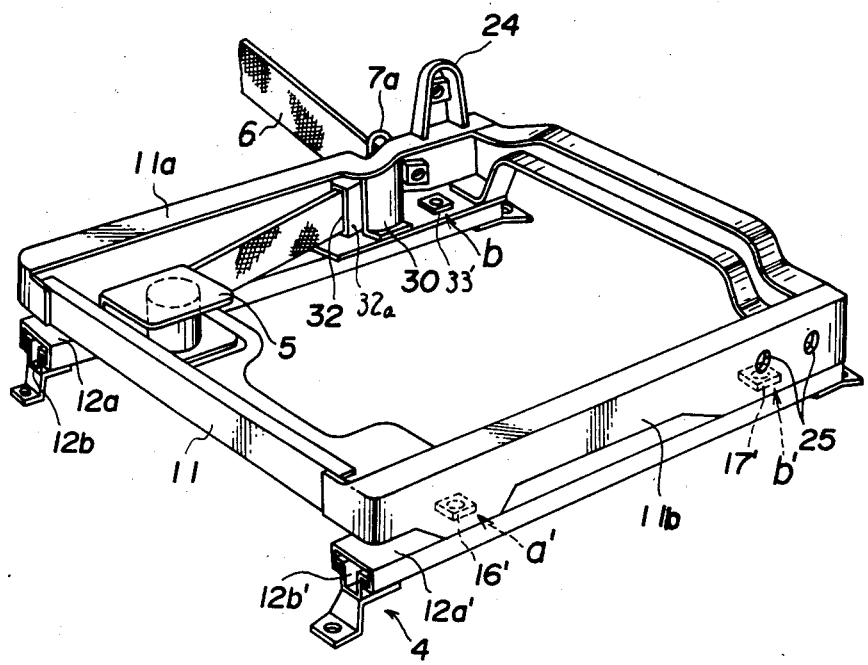
FIG. 7 is a perspective view of a cushion frame included in the vehicle seat shown in FIG. 6.
Figure 8:
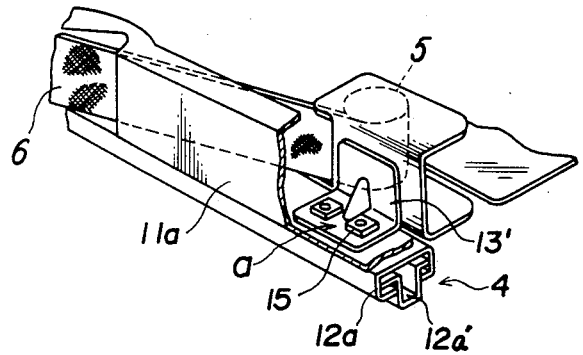
FIG. 8 is a partially cut-away perspective view of a portion of the cushion frame shown in FIG. 7; and, FIG. 9 is a plan view of a side frame section of the same cushion frame in which the passive restraint according to the present invention is mounted.

We will now describe the passive restraint of the invention in detail with reference to FIGS. 7 through 9.

The retractor (5), together with one (12a) of the movable-side rails of the slide rail (4), is fastened and fixed by a bolt/nut (15) through a bracket (13') to the front interior of one (11a) of the side frame sections of a cushion frame (11), i.e., to the front assembled portion (a) of the one movable-side rail (12a). The seat belt (6) to be wound up around and stored within the retractor (5) is guided out through an insertion bore (32) formed in the side surface of the one side frame section (11a) of the cushion frame (11).

The belt guide (7) is fixed to the rear portion of the one side frame portion (11a) of the cushion frame (11), or a position adjacent to the rear assembly portion (b) of the one movable-side rail (12a) by means of a bolt/nut (33'), and also includes a guide ring (7a) fixed to the tip end thereof. The seat belt (6) that is directed through the belt insertion bore (32) is inserted through this guide ring (7a) and is then folded back in a forward direction to be guided forwardly of the seat cushion.

The belt insertion bore (32) must be so formed on the side surface of the one side frame section (11a) of the cushion frame (11) as to lie along a line (l) connecting the retractor (5) and the guide ring (7a) of the belt guide (7). For this purpose, first and inwardly bent surface (33) is formed in the side surface of the one side frame section (11a) of the cushion frame, and the insertion bore (32) is then formed in this bent surface (33) in such a manner to be longer vertically. This belt insertion bore (32) is also provided with an inwardly directed guide frame (32a).

In the drawings, reference numerals (16') and (17') respectively designate bolt/nut means respectively provided in the front and rear assembled portions (a') and (b') of the other movable-side rail (12a') with respect to the other side frame section (11b) of the cushion frame (11).

The one side frame section (11a) of the cushion frame (11) comprises a mounting surface (14') in its rear portion for mounting the belt guide (7). This mounting surface (14') is inclined substantially at a biased angle of the bent angle of the seat belt (6), that is to say, it is so formed as to incline in a direction of an approximately bisected line (e) extending centrally between an input direction (i.e., direction of the above-mentioned line l) in which the seat belt (6) is inserted into the cushion frame (11) and a bent direction (i.e., direction of a line c) in which the seat belt (6) is bent at the guide ring (7a). As a result of this, only the tension of the seat belt (6) can be applied to the belt guide (7) mounted to the thus formed mounting surface (14').

Also, a stiffening plate (30) is fixedly secured to the interior portion of the bent surface (33) of the one side frame section (11a) of the cushion frame (11) to provide a closed section there so as to compensate the possible reduced strength of the same section due to the formation of the belt insertion bore (32).

What is claimed is:

1. A passive restraint for use in a vehicle seat comprising:
    a cushion frame to support a cushion which frame includes a pair of side frame sections, at least one of said side frame sections having a pair of upper surfaces separated by a side surface;
    a retractor fixed to an inside front portion of said one side frame section;
    a belt guide mounted to an outside rear portion of said one side frame section of said cushion frame;
    said one side frame section also including means defining a notched portion formed in both said pair of upper surfaces and said side surface at a location corresponding to the fixed position of said retractor; and
    a seat belt extending from said retractor through said notched portion and then along an exterior of said side surface of said one side frame section of said cushion frame, whereby said seat belt is turned over at said belt guide (as viewed from above).

2. The passive restraint as set forth in claim 1, wherein said retractor is integrally fastened to said cushion frame and a slide rail by means of a bolt/nut fastening means.

3. The passive restraint as set forth in claim 1, further comprising a slde rail and wherein said belt guide is fixedly secured adjacent to an assembly portion of said slide rail disposed in the rear portion of said one side frame section of said cushion frame by means of a bolt-/nut fastening means.

4. The passive restraint as set forth in claim 1, further comprising a slide rail and a casing for said retractor and wherein said retractor is mounted to a front assembly portion of said slide rail by means of said casing.

5. The passive restraint as in claim 4 further comprising a guide roller journalled to said casing.

6. A passive restraint for use in a vehicle seat comprising:
    a seat belt;
    a cushion frame adapted to support a seat cushion and including a pair of side frame sections, one of said side frame sections defining a notched portion establishing a space which physically separates said one side frame section into forward and rearward portions;
    a seat belt guide fixed to said rear portions of said one side frame section;
    a casing rigidly fixed to both said forward and rearward portions so as to span said space therebetween; and
    belt retractor means mounted to said case adjacent said notched portion for retracting said seat belt, wherein
    said seat belt extends from said retractor means through said notched portion adjacent thereto and then along an exterior surface of said one side frame section so as to pass through said seat belt guide.

7. A passive restraint as in claim 6 further comprising a guide roller journalled to said casing.

8. A passive restraint for use in a vehicle seat comprising:
    a seat belt;
    a cushion frame adapted to support a seat cushion and including a pair of side frame sections, one of said side frame sections including an inwardly bent portion and an insertion bore formed in said inwardly bent portion;
    a seat belt guide located rearwardly of said insertion bore; and
    belt retractor means fixed to a front portion of said one side frame section for retracting said seat belt;
    said seat belt extending from said belt retractor means, through said insertion bore, to an inlet side of said seat belt guide along a linear insertion path l, said seat belt being wrapped around said seat belt guide and exiting same along a linear exit path forming an angle $\alpha$ with said insertion path; and
    mounting means to angularly mount said seat belt guide to said one side frame section so that said seat belt guide is disposed along a bisecting line e which generally bisects said angle $\alpha$, wherein said mounting means permits only the tension of said seat belt to be applied to said seat belt guide.

9. A passive restraint as in claim 8 wherein said one side frame section includes a stiffening plate adjacent said inwardly-bent portion.

* * * * *